(12) United States Patent
Kim (10) Patent No.: US 11,787,329 B2
(45) Date of Patent: Oct. 17, 2023

(54) LAMP MODULE FOR INDUSTRIAL VEHICLE AND INDUSTRIAL VEHICLE INCLUDING THE SAME

(71) Applicant: Hyundai Doosan Infracore Co., Ltd., Incheon (KR)

(72) Inventor: Mi Yeon Kim, Incheon (KR)

(73) Assignee: HYUNDAI DOOSAN INFRACORE CO., LTD., Incheon (KR)

( * ) Notice: Subject to any disclaimer, the term of this patent is extended or adjusted under 35 U.S.C. 154(b) by 0 days.

(21) Appl. No.: 17/668,087

(22) Filed: Feb. 9, 2022

(65) Prior Publication Data

US 2022/0266741 A1 Aug. 25, 2022

(30) Foreign Application Priority Data

Feb. 19, 2021 (KR) .......................... 10-2021-0022687

(51) Int. Cl.
*B60Q 1/00* (2006.01)
*B60Q 1/22* (2006.01)
*E02F 9/08* (2006.01)

(52) U.S. Cl.
CPC ............. *B60Q 1/0035* (2013.01); *B60Q 1/22* (2013.01); *E02F 9/0858* (2013.01); *B60Q 2800/20* (2022.05)

(58) Field of Classification Search
CPC ......... B60Q 1/0029–0058; B60Q 1/007–0094; B60Q 1/22–549; B60Q 2800/20; B60Y 2200/15–412; B60Y 2400/306
See application file for complete search history.

(56) References Cited

U.S. PATENT DOCUMENTS

| 6,902,307 B2 * | 6/2005 | Strazzanti ................ B60Q 1/26 362/464 |
| 2021/0010654 A1 * | 1/2021 | Ko .......................... B60Q 1/30 |

FOREIGN PATENT DOCUMENTS

KR  10-2011-0056114 A  5/2011

* cited by examiner

*Primary Examiner* — Jason M Han
(74) *Attorney, Agent, or Firm* — Hauptman Ham, LLP (57) ABSTRACT

Disclosed is a lamp module for an industrial vehicle. The lamp module for an industrial vehicle according to an embodiment of the present utility model can be installed inside a counterweight, unlike the conventional method of embedding in the counterweight, thereby improving workability and assemblability of the operator and improving visibility.

7 Claims, 7 Drawing Sheets

LAMP MODULE FOR INDUSTRIAL VEHICLE AND INDUSTRIAL VEHICLE INCLUDING THE SAME

CROSS REFERENCE TO RELATED APPLICATION

The present application claims priority to Korean Patent Application No. 10-2021-0022687, filed Feb. 19, 2021, the entire contents of which is incorporated herein for all purposes by this reference.

BACKGROUND OF THE INVENTION

Field of the Invention

The present utility model relates to a lamp module integrally assembled with a counterweight, and more particularly, to a lamp module for an industrial vehicle and an industrial vehicle including the lamp module.

Description of the Related Art

In general, a loader is a device for loading or transporting soil or aggregate to a dump vehicle at a construction site, and there are wheel loaders and track loaders. The wheel loader uses a large low-pressure tire, and can perform excavation work, and a front-wheel drive type is mainly used for the wheel loader.

The conventional wheel loader has excellent maneuverability, so the driving speed is fast and the workability is excellent even on paved roads. That is, the wheel loader has a structure in which a main power transmission device and an engine are mounted on a rear frame, working devices such as a bucket, a boom, and a hydraulic cylinder are mounted on a front frame, tires are installed on a lower part and fenders are mounted on the upper part of the tires.

In the conventional lamp, it is difficult to secure a space when an operator installs the lamp, so that workability is reduced, and the number of parts for assembling is increased, thereby causing a problem in that an assemblability is reduced.

DOCUMENTS OF RELATED ART (Patent Document 1) KR published patent No. 10-2011-0056114

SUMMARY OF THE INVENTION

The present embodiments provide a lamp module for an industrial vehicle with improved workability of an operator through a lamp module that is integrally assembled with a counterweight, and an industrial vehicle including the lamp module.

A lamp module for an industrial vehicle according to the present embodiment is a lamp module 1 which is spaced apart from each other by being located inside an insertion groove 2a formed at both left and right sides of a counterweight 2, the lamp module, and the lamp module includes a cover part 120 that is installed in the insertion grooves 2a; and a lamp irradiation part 210 that is coupled to a front surface of the cover part 120 and has a predetermined width and length.

The lamp irradiation part 210 includes a first lamp 212 that turns on with a direction indicating function and locates on an uppermost side; a second lamp 214 that locates below the first lamp 212 and turns on in conjunction with a brake operation; and a third lamp 216 that locates below the second lamp 214 and turns on as a tail lamp.

The lamp irradiation part 210 is spaced apart from left and right both ends of the counterweight 2 to an outer end of the lamp irradiation part 210 by a first separation distance L1.

The lamp module 1 further includes a support bracket 110 that is integrally molded with the counterweight 2.

The cover part 120 includes a first cover 120a that is located on a front surface of the support bracket 110; and a second cover 120b that is located on a front surface of the first cover 120a and is fastened together with the lamp irradiation part 210.

When viewed from a side, the lamp irradiation part 210 irradiates light in directions of first and second inclination angles $\alpha 1$ and $\alpha 2$, respectively, toward upper and lower sides based on an imaginary extension line extending horizontally to an outside when turned on, and when viewed from above, the lamp irradiation part 210 irradiates light in directions of third and fourth inclination angles $\beta 1$ and $\beta 2$, respectively, toward outside and inside of the counterweight 2.

The first and second inclination angles $\alpha 1$ and $\alpha 2$ are irradiated at the same angle, and the third and fourth inclination angles $\beta 1$ and $\beta 2$ are irradiated at an inclination angle at which the third inclination angle $\beta 1$ is relatively larger than the fourth inclination angle $\beta 2$.

The lamp irradiation part 210 includes a front portion 210a that extends to a predetermined length while looking at an outer front surface of the counterweight 2; a first side portion 210b that extends to a predetermined length while looking at an outside of the counterweight 2 from left and right sides of the front portion 210a; and a second side portion 210c that extends to a predetermined length while looking at an inside of the counterweight 2.

The present embodiment relates to an industrial vehicle including a counterweight that is formed at a rear of an industrial vehicle; and a lamp module that is spaced apart from each other by being located inside an insertion groove formed at both left and right sides of the counterweight. The lamp module includes a cover part that is installed in the insertion grooves; a lamp irradiation part that is coupled to a front surface of the cover part and has a predetermined width and length; and a support bracket that is integrally molded with the counterweight.

In the present embodiments, since the lamp module can be integrally assembled with the counterweight, workability of an operator is improved, and the number of parts required for assembly is reduced, thereby reducing costs.

In the present embodiments, the lamp module has improved appearance quality, and improved stability by preventing direct collision with external structures.

DETAILED DESCRIPTION OF THE INVENTION

A lamp module for an industrial vehicle according to an embodiment of the present utility model will be described with reference to the drawings.

Referring to FIGS. 1 to 5, the present embodiment relates to lamp modules 1 spaced apart from each other by being respectively located inside insertion grooves 2a formed at the left and right sides of a counterweight 2 provided in a wheel loader.

The lamp module 1 prevents damage due to direct contact with an external structure (not shown) during the operation of the industrial vehicle, simplifies the structure to improve assemblability, and reduces the number of parts, thereby reducing overall manufacturing cost.

The lamp module 1 according to the present embodiment includes a cover part 120 that is installed in the insertion groove 2a and a lamp irradiation part 210 that is coupled to the front surface of the cover part 120, and has a predetermined width and length.

In the present embodiment, since the lamp module 1 is located inside the insertion groove 2a formed in the counterweight 2, it is installed without being exposed to the outside. In this case, the lamp module 1 can be used stably because it minimizes collision with scattering products (not shown) scattered from the outside during the operation of the industrial vehicle, or prevents damage due to contact with external structures.

The counterweight 2 has inclined portions 2b respectively formed on the upper and lower sides of the lamp module 1 to improve visibility when viewed from the outside.

Since the lamp module 1 according to the present embodiment is installed in a state exposed to the outside rather than buried inside the counterweight 2 as in the conventional art, the visual visibility of the operator can be further improved.

The present embodiment further includes a support bracket 110 that is integrally molded with the counterweight 2, and the support bracket 110 is coupled to the cover part 120.

Since the support bracket 110 of the lamp module 1 is integrally formed with the counterweight 2, the installation work of the operator becomes simpler and more convenient, and thus, the workability and efficiency are simultaneously improved.

The support bracket 110 is formed in a cylindrical shape, for example, and the support bracket 110 is coupled together with the cover part 120 to be described later through a separately provided coupling member 3.

The cover part 120 includes a first cover 120a that is located on the front surface of the support bracket 110 and is installed inside the insertion groove 2a through the coupling member 3, and a second cover 120b that is located on the front surface of the first cover 120a and is fastened together with the lamp irradiation part 210.

Figure 1:
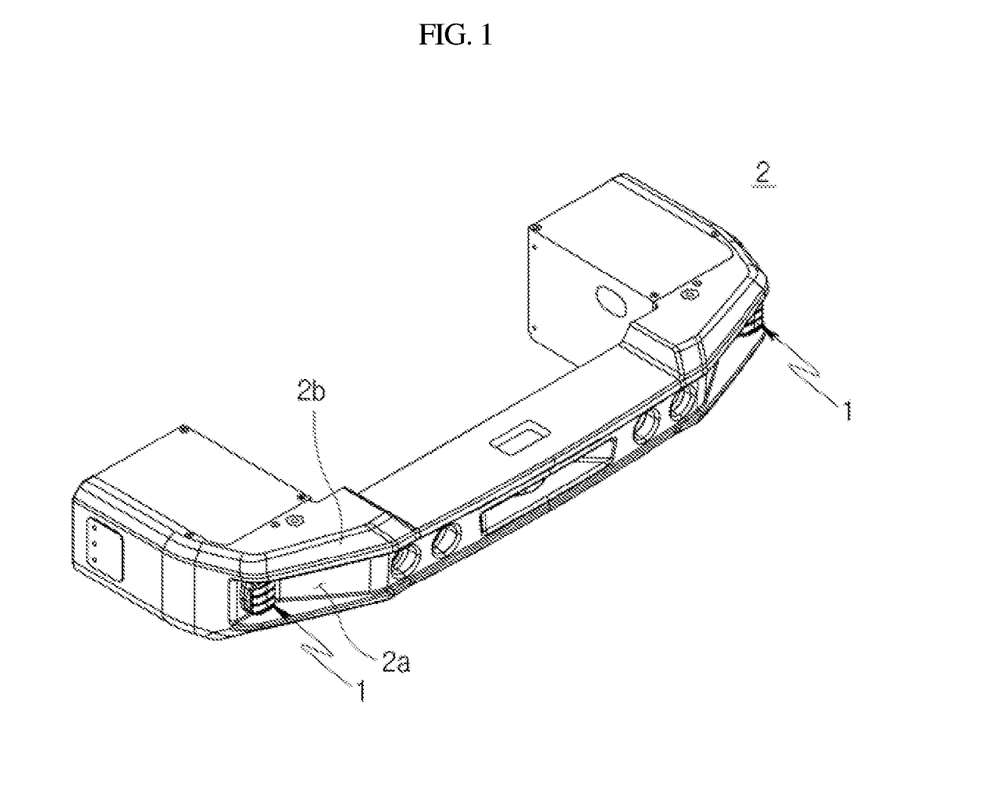
FIGS. 1 to 2 are perspective views showing a state in which a lamp module according to the present embodiment is installed in a counterweight.
Figure 2:
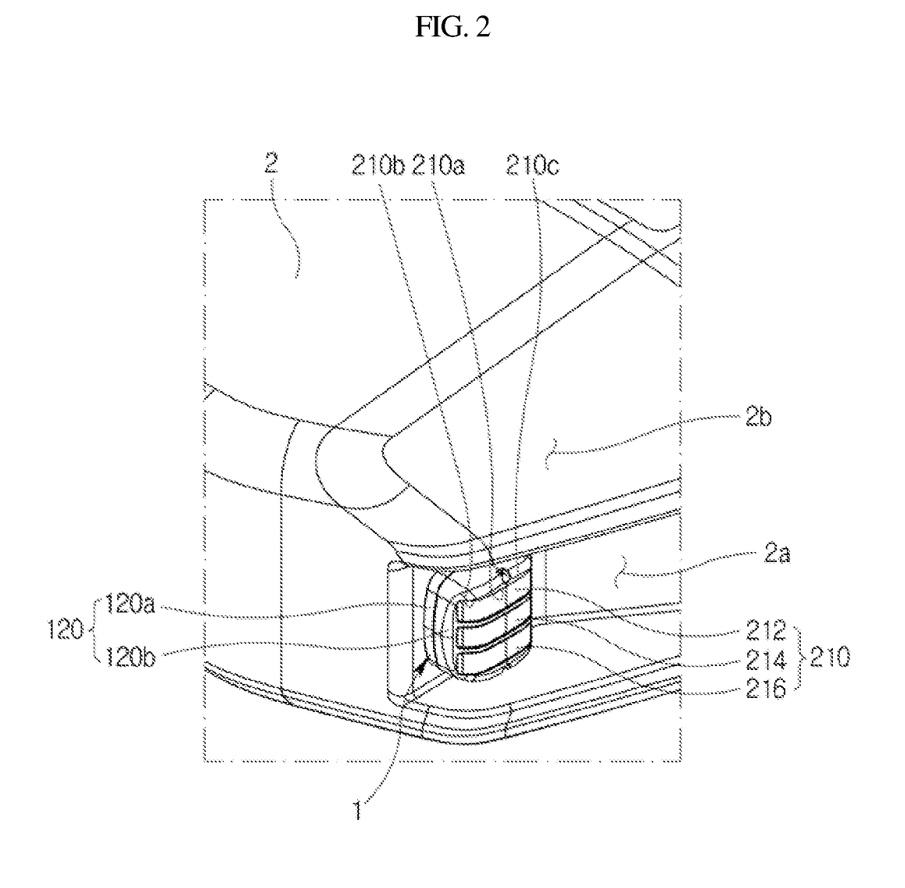
Figure 3:
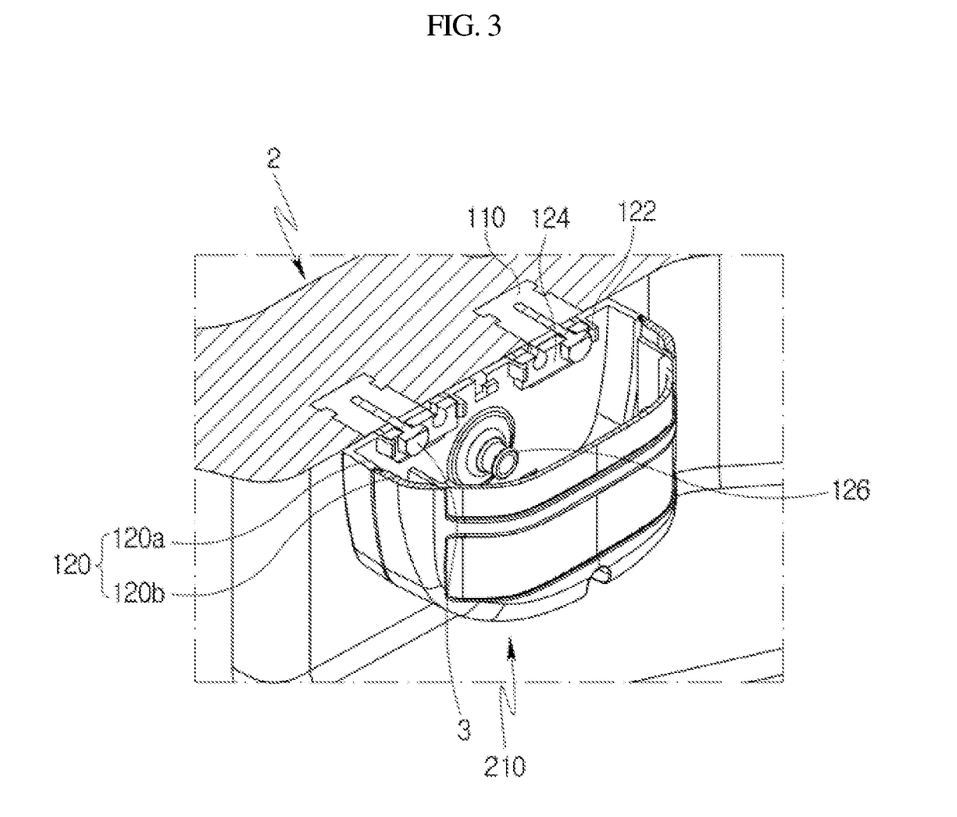
FIG. 3 is a lateral cross-sectional view of a lamp module according to the present embodiment.
Figure 4:
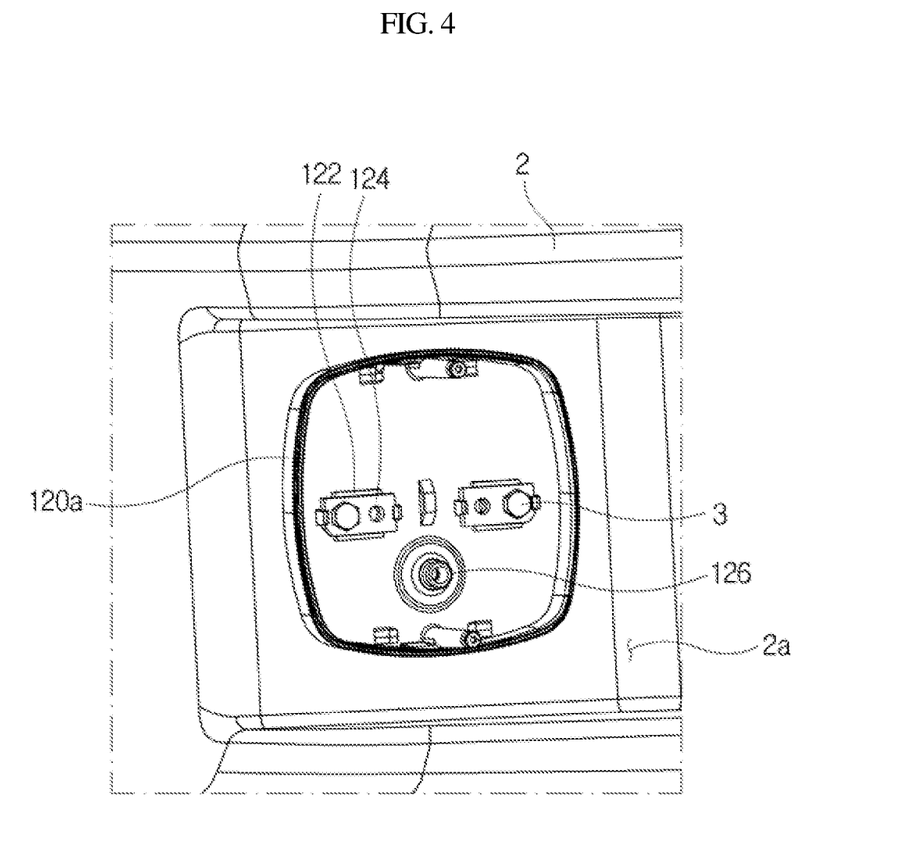
FIG. 4 is a perspective view showing an inside of a cover part of a lamp module according to the present embodiment.
Figure 5:
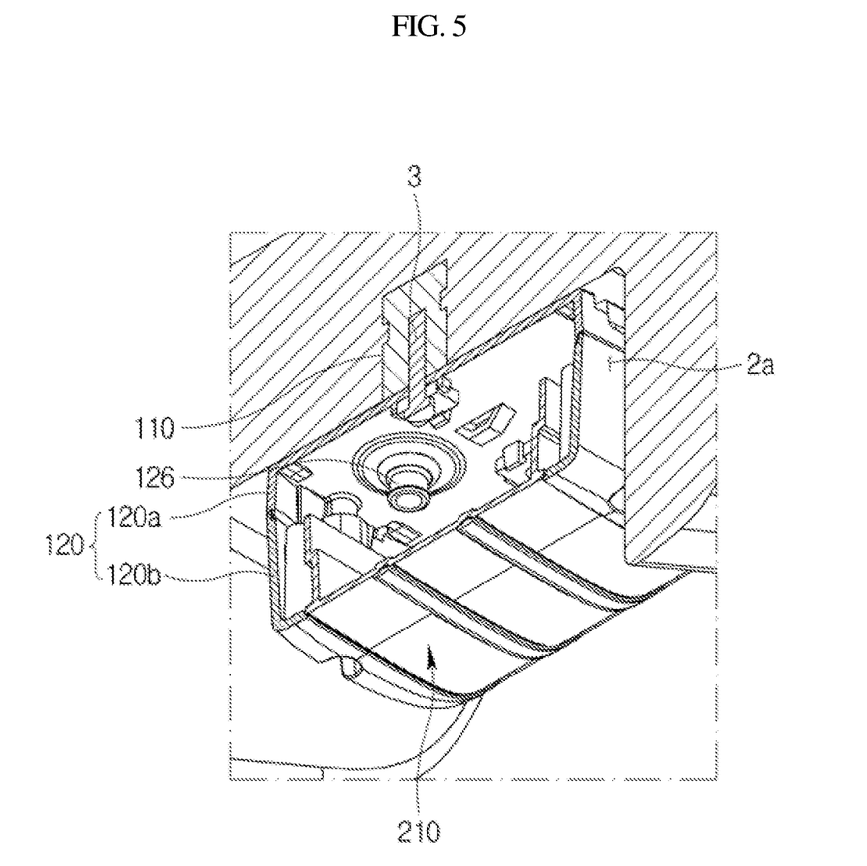
FIG. 5 is a longitudinal cross-sectional view of a lamp module according to the present embodiment.

A guide part 122 is provided in the first cover 120a according to the present embodiment so that the position is maintained at an original position when the coupling member 3 is installed.

In addition, a guide plate 124 is provided inside the guide part 122 so that the coupling member 3 does not come into direct surface contact with the first cover 120a, so that the first cover 120a is prevented from being deformed or damage.

The guide part 122 is formed in a shape surrounding the edge of the guide plate 124, but may be changed in another shape.

The coupling member 3 is coupled to the guide plate 124 and fixed to the support bracket 110, and two guide parts 122 are provided inside the first cover 120a based on the drawing. In this way, when the coupling member 3 is coupled to the support bracket 110 through the guide plate 124, the first cover 120a may be not separated from the counterweight 2 or may be fixed without a gap after installation.

The first cover 120a is provided with a harness passage 126 protruding outward in the front to supply power to the lamp irradiation part 210 to be described later, so that the operator can perform the operation more conveniently by inserting a harness into the harness passage 126.

For reference, a harness hole (not shown) is formed in the counterweight 2 facing the harness passage 126, so that the harness can be easily inserted from the rear inner side of the counterweight 2.

The second cover 120b is fixed to the upper and lower sides of the first cover 120a in a screw coupling manner, respectively, in a state in which the lamp irradiation part 210 is coupled thereto.

The lamp irradiation part 210 according to the present embodiment includes a first lamp 212 that is turned on with a direction indicating function and is located at the uppermost side, a second lamp 214 that is located below the first lamp 212 and is turned on in conjunction with a brake operation, and a third lamp 216 that is located below the second lamp 214 and is turned on as a tail lamp.

The first to third lamps 212, 214, and 216 may be turned on in different colors to improve visual visibility for the operator, and since LEDs are used as an example, they may be turned on with brighter light during the day or at night.

The first lamp 212 is turned on when the industrial vehicle intends to turn right or left.

The lamp irradiation part 210 according to the present embodiment includes a front portion 210a that extends to a predetermined length while looking at the outer front surface of the counterweight 2, a first side portion 210b that extends to a predetermined length while looking at the outside of the counterweight 2 from left and right sides of the front portion 210a, and a second side portion 210c that extends to a predetermined length while looking at the inside of the counterweight 2.

The length of the front portion 210a is not limited to the length shown in the drawing and can be changed in various ways, and the first and second side portions 210b and 210c extend at the angle and length shown in the drawing so that the operator can easily recognize it even from the side location of the wheel loader.

Referring to FIG. 2 or 6 to 8, in the lamp module 1 according to the present embodiment, the lamp irradiation part 210 is spaced apart from the left and right both ends of the counterweight 2 to the outer end of lamp irradiating part 210 by a first separation distance L.

For example, the first separation distance L1 is, for example, 400 mm.

The reason that the lamp module 1 is located at the above location is the location corresponds to a separation distance that can minimize the occurrence of damage due to direct contact or collision with an external structure (not shown) during the operation of the industrial vehicle.

Figure 6:
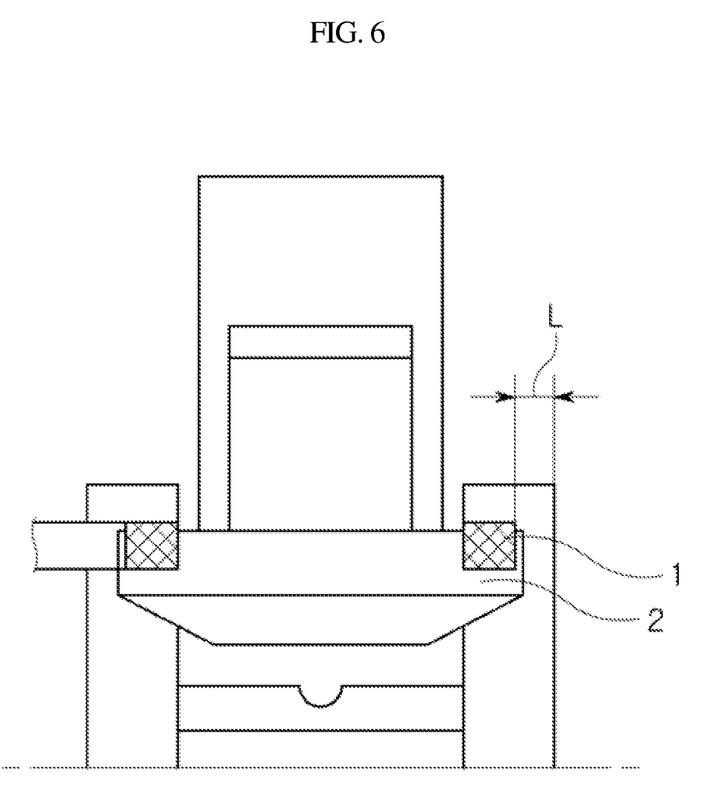
FIGS. 6 to 8 are views showing a lamp module and first to fourth inclination angles of the lamp module according to the present embodiment.
Figure 7:
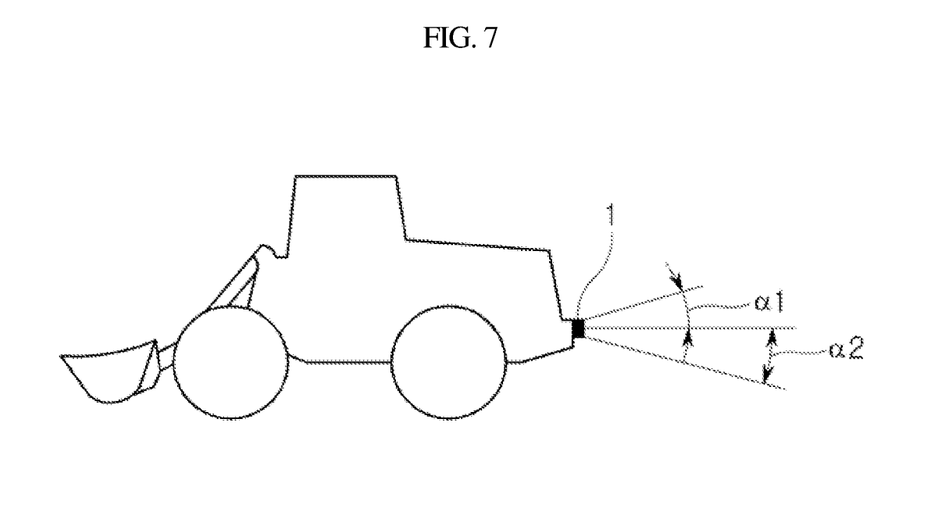
Figure 8:
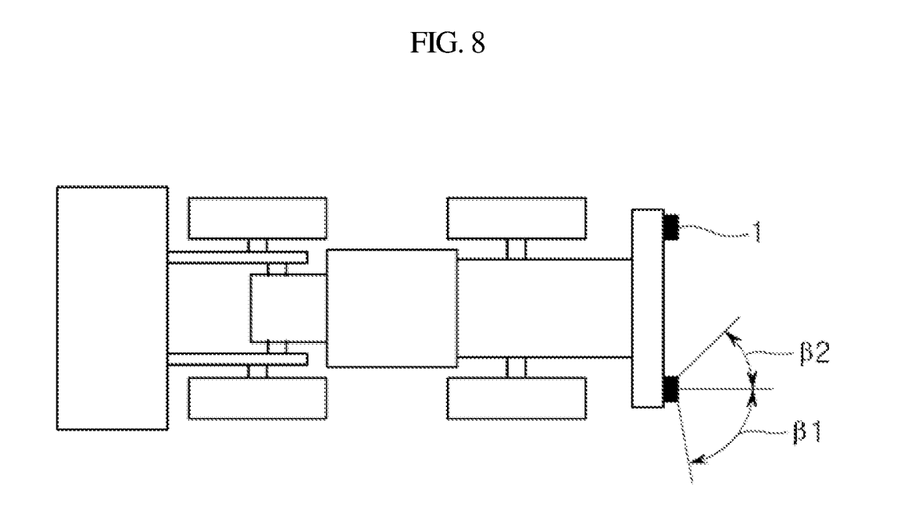

When viewed from the side, the lamp irradiation part 210 may irradiate light in the directions of first and second inclination angles α1 and α2, respectively, toward upper and lower sides based on an imaginary extension line extending horizontally to the outside when turned on.

In addition, the lamp irradiation part 210 irradiates light in the directions of the third and fourth inclination angles β1 and β2, respectively, toward the outside and the inside of the counterweight 2 when viewed from above.

The first and second inclination angles α1 and α2 are respectively irradiated at the same angle at an angle of 15 degrees, and the third and fourth inclination angles β1 and β2 are irradiated at an inclination angle at which the third inclination angle β1 is relatively larger than the fourth inclination angle β2.

For example, the third inclination angle β1 is irradiated at an angle of 80 degrees, and the fourth inclination angle β2 is irradiated at an angle of 45 degrees.

When irradiation is made through the lamp irradiation part 210 at such an angle, accurate lighting can be achieved while visual visibility is improved.

The present embodiment may be applied in an industrial vehicle including the above-described lamp module 1, and the industrial vehicle may include, for example, a wheel loader, but the present embodiment may be installed in other types of vehicles.

DESCRIPTION OF REFERENCE NUMERALS

1: lamp module
2: counterweight
110: support bracket
120: cover part
210: lamp irradiation part
212, 214, 216: first, second, third lamps
210a, 210b, 210c: front portion, first side portion, second side portion

What is claimed is:

1. A counterweight bumper for an industrial vehicle, the counterweight bumper comprising:
    a pair of insertion grooves formed at left and right sides of the counterweight bumper;
    a pair of support brackets, each support bracket integrally molded with the counterweight bumper at the corresponding insertion groove of the pair of insertion grooves, respectively; and
    a pair of lamp modules coupled to the pair of support brackets, respectively, and spaced apart from each other by being located inside the corresponding insertion groove of the pair of insertion grooves,
    wherein each lamp module of the pair of lamp modules comprises:
        a cover part coupled to the corresponding support bracket of the pair of support brackets among the two pairs of support brackets at the corresponding insertion groove of the pair of insertion grooves; and
        a lamp irradiation part that is coupled to a front surface of the cover part and has a predetermined width and length,
    wherein the lamp irradiation part includes:
        a front portion that extends to a predetermined length while looking at an outer front surface of the counterweight bumper;
        a first side portion that extends to a predetermined length while looking at an outside of the counterweight bumper from left and right sides of the front portion; and
        a second side portion that extends to a predetermined length while looking at an inside of the counterweight bumper, and
    wherein the counterweight bumper has inclined portions respectively formed on the upper and lower sides of the lamp module.

2. The counterweight bumper for an industrial vehicle according to claim 1, wherein the lamp irradiation part includes:
    a first lamp that is turned on with a direction indicating function and is located on an uppermost side;
    a second lamp that is located below the first lamp and is turned on in conjunction with a brake operation; and
    a third lamp that is located below the second lamp and is turned on as a tail lamp.

3. The counterweight bumper for an industrial vehicle according to claim 1, wherein the lamp irradiation part is spaced apart from left and right both ends of the counterweight bumper to an outer end of the lamp irradiation part by a first separation distance.

4. The counterweight bumper for an industrial vehicle according to claim 1, wherein the cover part includes:
    a first cover that is located on a front surface of the corresponding support bracket; and
    a second cover that is located on a front surface of the first cover and is fastened together with the lamp irradiation part.

5. The counterweight bumper for an industrial vehicle according to claim 1, wherein
    when viewed from a side, the lamp irradiation part irradiates light in directions of first and second inclination angles α1 and ☆2, respectively, toward upper and lower sides based on an imaginary extension line extending horizontally to an outside when turned on, and
    when viewed from above, the lamp irradiation part irradiates light in directions of third and fourth inclination angles β1 and β2, respectively, toward outside and inside of the counterweight.

6. The counterweight bumper for an industrial vehicle according to claim 5, wherein the first and second inclination angles α1 and α2 are irradiated at the same angle, and the third and fourth inclination angles β1 and β2 are irradiated at an inclination angle at which the third inclination angle β1 is relatively larger than the fourth inclination angle β2.

7. An industrial vehicle comprising:
    a counterweight bumper that is formed at a rear of an industrial vehicle, wherein the counterweight bumper comprises,
        a pair of insertion grooves formed at left and right sides of the counterweight bumper, and
        a pair of support brackets integrally molded with the counterweight bumper at the corresponding insertion groove of the pair of insertion grooves; and
    a pair of lamp modules coupled to the pair of support brackets and spaced apart from each other by being located inside the corresponding insertion groove of the pair of insertion grooves,
    wherein each lamp module of the pair of lamp modules includes:
        a cover part coupled to the corresponding support bracket of the pair of support brackets at the corresponding insertion groove of the pair of insertion grooves; and
        a lamp irradiation part that is coupled to a front surface of the cover part and has a predetermined width and length, wherein the lamp irradiation part includes:
- a front portion that extends to a predetermined length while looking at an outer front surface of the counterweight bumper;
- a first side portion that extends to a predetermined length while looking at an outside of the counterweight bumper from left and right sides of the front portion;
- a second side portion that extends to a predetermined length while looking at an inside of the counterweight bumper, and
- wherein the counterweight bumper has inclined portions respectively formed on the upper and lower sides of the lamp module.

* * * * *